US008412222B2

(12) United States Patent
Agrawal et al.

(10) Patent No.: US 8,412,222 B2
(45) Date of Patent: Apr. 2, 2013

(54) BROADCAST-MULTICAST TRANSMISSION WITH RATE ADAPTION

(75) Inventors: Avneesh Agrawal, San Diego, CA (US); Alexei Y. Gorokhov, San Diego, CA (US); Mehmet I. Gurelli, San Diego, CA (US); Naga Bhushan, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 12/490,078

(22) Filed: Jun. 23, 2009

(65) Prior Publication Data

US 2009/0323577 A1    Dec. 31, 2009

Related U.S. Application Data

(60) Provisional application No. 61/076,359, filed on Jun. 27, 2008.

(51) Int. Cl.
*H04B 1/00* (2006.01)

(52) U.S. Cl. ............. 455/452.2; 370/312; 714/748; 714/749; 714/750

(58) Field of Classification Search .......... 370/312; 455/452.2
See application file for complete search history.

(56) References Cited

U.S. PATENT DOCUMENTS

| | | | |
|---|---|---|---|
| 7,116,944 B2* | 10/2006 | Das et al. | 455/69 |
| 7,197,021 B2* | 3/2007 | Seo et al. | 370/335 |
| 7,212,826 B2* | 5/2007 | Fisher | 455/452.2 |
| 7,310,499 B2* | 12/2007 | Magnusson et al. | 455/69 |
| 7,333,457 B2* | 2/2008 | Gopalakrishnan et al. | 370/335 |
| 7,343,172 B2* | 3/2008 | Hwang | 455/522 |
| 7,346,034 B2* | 3/2008 | Takano et al. | 370/331 |
| 7,372,836 B2* | 5/2008 | Hwang et al. | 370/335 |
| 7,408,913 B2* | 8/2008 | Khan | 370/345 |
| 7,443,822 B2* | 10/2008 | Lindskog et al. | 370/338 |

(Continued)

FOREIGN PATENT DOCUMENTS

| WO | WO 2005071887 A1 * | 8/2005 |
|---|---|---|
| WO | WO2008007199 A2 | 1/2008 |

(Continued)

OTHER PUBLICATIONS

Cho et al., "DL Power Control on Persistent Scheduling or PDCCH Link Adaptation", Nov. 5, 2007, KBK & Assocaites, Provisional Application, 14 pages.*

(Continued)

*Primary Examiner* — Hai Nguyen
(74) *Attorney, Agent, or Firm* — Florin Corie; John J. Ketchum

(57) ABSTRACT

Techniques for supporting broadcast/multiple transmission to multiple terminals with feedback and rate adaptation are described. In an aspect, a combination of HARQ and at least one shared feedback channel may be used to support broadcast/multicast transmission. In one design, a base station may send at least one transmission of a packet to multiple terminals, one transmission at a time. The base station may receive feedback information (e.g., NAK) for the packet from the terminals on the shared feedback channel(s). The base station may determine whether to terminate the packet early and/or may select at least one transmission parameter for another packet based on the feedback information for the packet. In another aspect, a transport format for a broadcast/multicast transmission may be selected based on CQI information from terminals receiving the transmission. The terminals may send CQI information at a slow rate and/or only certain terminals may send CQI information.

53 Claims, 9 Drawing Sheets

U.S. PATENT DOCUMENTS

| | | | |
|---|---|---|---|
| 7,499,709 B2* | 3/2009 | Das et al. | 455/455 |
| 7,876,727 B2* | 1/2011 | Hwang | 370/331 |
| 7,907,570 B2* | 3/2011 | Hwang | 455/522 |
| 7,936,731 B2* | 5/2011 | Park et al. | 370/336 |
| 7,952,991 B2* | 5/2011 | Kim et al. | 370/210 |
| 7,961,695 B2* | 6/2011 | Fukuoka et al. | 370/342 |
| 8,014,352 B2* | 9/2011 | Tiirola et al. | 370/329 |
| 8,023,450 B2* | 9/2011 | Abedi | 370/328 |
| 8,064,329 B2* | 11/2011 | Chen et al. | 370/208 |
| 8,089,911 B2* | 1/2012 | Huang et al. | 370/312 |
| 8,102,896 B2* | 1/2012 | Pajukoski et al. | 375/146 |
| 8,199,706 B2* | 6/2012 | Bertrand et al. | 370/329 |
| 8,223,854 B2* | 7/2012 | Ghosh et al. | 375/260 |
| 8,295,779 B2* | 10/2012 | Cave et al. | 455/69 |
| 2003/0045288 A1* | 3/2003 | Luschi et al. | 455/434 |
| 2003/0228876 A1* | 12/2003 | Hwang | 455/522 |
| 2004/0085936 A1* | 5/2004 | Gopalakrishnan et al. | 370/335 |
| 2005/0063344 A1* | 3/2005 | Winzell | 370/335 |
| 2005/0138671 A1 | 6/2005 | Love et al. | |
| 2005/0181811 A1* | 8/2005 | Magnusson et al. | 455/458 |
| 2006/0153061 A1* | 7/2006 | Nishio | 370/208 |
| 2006/0171356 A1* | 8/2006 | Gurelli et al. | 370/329 |
| 2007/0121554 A1* | 5/2007 | Luo et al. | 370/335 |
| 2007/0171849 A1* | 7/2007 | Zhang et al. | 370/310 |
| 2007/0189223 A1* | 8/2007 | Hwang | 370/331 |
| 2008/0062932 A1* | 3/2008 | Hwang | 370/331 |
| 2008/0095040 A1* | 4/2008 | Kwon et al. | 370/210 |
| 2008/0165873 A1* | 7/2008 | Ghosh et al. | 375/261 |
| 2008/0212464 A1* | 9/2008 | Kim et al. | 370/210 |
| 2008/0212582 A1* | 9/2008 | Zwart et al. | 370/390 |
| 2008/0212615 A1* | 9/2008 | Ranta-Aho et al. | 370/498 |
| 2008/0240269 A1* | 10/2008 | Pajukoski et al. | 375/260 |
| 2009/0006925 A1* | 1/2009 | Pan | 714/758 |
| 2009/0034466 A1* | 2/2009 | Lindskog et al. | 370/329 |
| 2009/0070650 A1* | 3/2009 | Bourlas et al. | 714/748 |
| 2009/0103482 A1* | 4/2009 | Imamura et al. | 370/329 |
| 2009/0122776 A1* | 5/2009 | Folkstedt et al. | 370/342 |
| 2009/0201825 A1* | 8/2009 | Shen et al. | 370/252 |
| 2009/0203383 A1* | 8/2009 | Shen et al. | 455/450 |
| 2009/0207725 A1* | 8/2009 | Zhang | 370/203 |
| 2009/0207771 A1* | 8/2009 | Lindskog et al. | 370/312 |
| 2009/0207793 A1* | 8/2009 | Shen et al. | 370/329 |
| 2009/0235139 A1* | 9/2009 | Park et al. | 714/750 |
| 2009/0239476 A1* | 9/2009 | Womack et al. | 455/68 |
| 2009/0310534 A1* | 12/2009 | Lindskog et al. | 370/328 |
| 2009/0316647 A1* | 12/2009 | Chen et al. | 370/330 |
| 2009/0323577 A1* | 12/2009 | Agrawal et al. | 370/312 |
| 2009/0323777 A1* | 12/2009 | Wang et al. | 375/148 |
| 2010/0034315 A1* | 2/2010 | Khandekar et al. | 375/297 |
| 2010/0113004 A1* | 5/2010 | Cave et al. | 455/422.1 |
| 2010/0130219 A1* | 5/2010 | Cave et al. | 455/450 |
| 2010/0238875 A1* | 9/2010 | Sung et al. | 370/329 |
| 2010/0265862 A1* | 10/2010 | Choi et al. | 370/311 |
| 2010/0296454 A1* | 11/2010 | Park et al. | 370/328 |
| 2011/0021230 A1* | 1/2011 | Moberg et al. | 455/507 |
| 2011/0096727 A1* | 4/2011 | Bergman et al. | 370/328 |
| 2011/0141960 A1* | 6/2011 | Liu et al. | 370/311 |
| 2011/0141996 A1* | 6/2011 | Yamada et al. | 370/329 |
| 2011/0194499 A1* | 8/2011 | Aiba et al. | 370/328 |
| 2011/0194502 A1* | 8/2011 | Sung et al. | 370/329 |
| 2011/0194516 A1* | 8/2011 | Aiba et al. | 370/329 |
| 2011/0243034 A1* | 10/2011 | Yamada et al. | 370/254 |
| 2011/0256868 A1* | 10/2011 | Nogami et al. | 455/435.1 |
| 2011/0261759 A1* | 10/2011 | Yamada et al. | 370/328 |
| 2011/0281615 A1* | 11/2011 | Yamada et al. | 455/524 |
| 2011/0317577 A1* | 12/2011 | Yamada et al. | 370/252 |
| 2012/0009959 A1* | 1/2012 | Yamada et al. | 455/507 |
| 2012/0069815 A1* | 3/2012 | Aiba et al. | 370/329 |
| 2012/0099553 A1* | 4/2012 | Aiba et al. | 370/329 |
| 2012/0106482 A1* | 5/2012 | Pajukoski et al. | 370/329 |
| 2012/0182942 A1* | 7/2012 | Ghosh et al. | 370/328 |
| 2012/0182949 A1* | 7/2012 | Aiba et al. | 370/329 |
| 2012/0263087 A1* | 10/2012 | Aiba et al. | 370/311 |
| 2012/0281576 A1* | 11/2012 | Yamada et al. | 370/252 |

FOREIGN PATENT DOCUMENTS

WO    WO2008024544 A2    2/2008

OTHER PUBLICATIONS

International Search Report and Written Opinion—PCT/US2009/048724—ISA/EPO—Jan. 29, 2010.

* cited by examiner

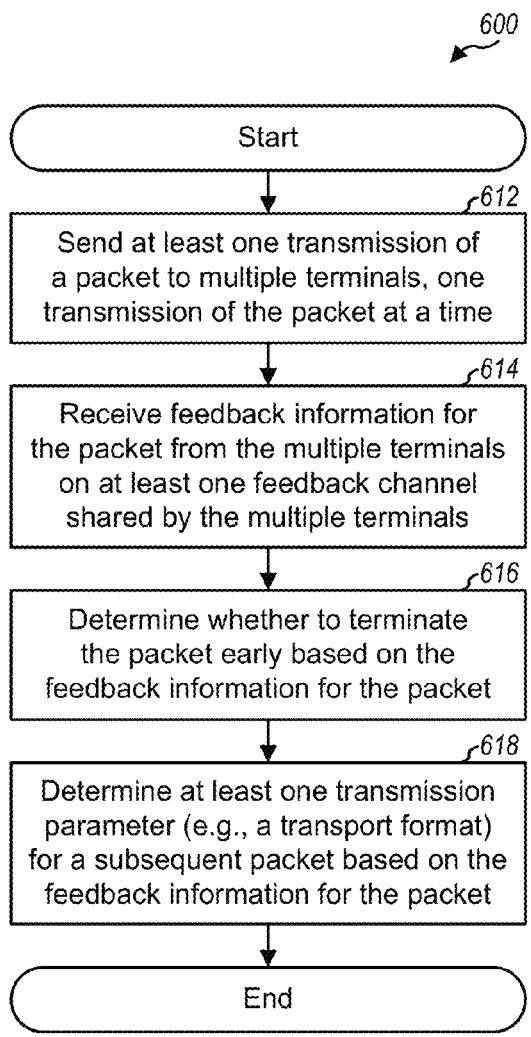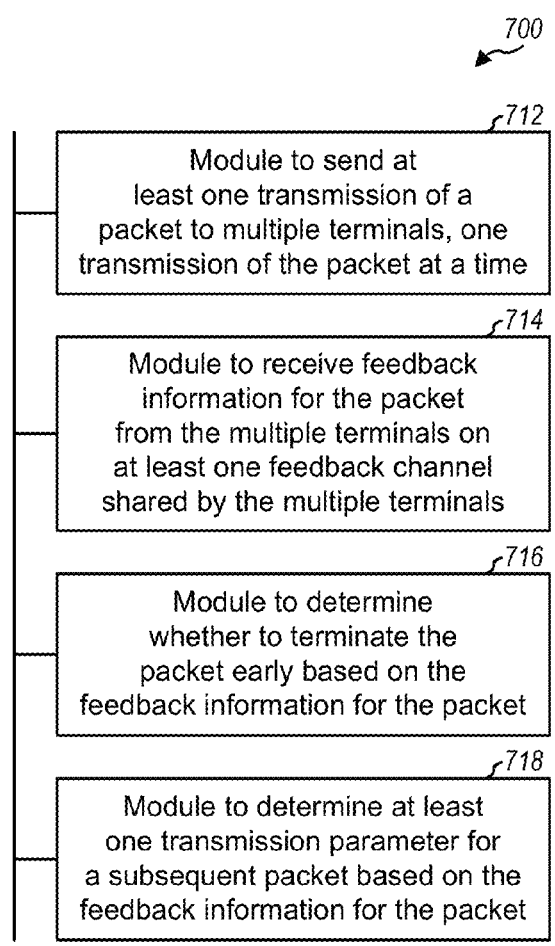
FIG. 6
FIG. 7

BROADCAST-MULTICAST TRANSMISSION WITH RATE ADAPTION

The present application claims priority to provisional U.S. Application Ser. No. 61/076,359, entitled "SCALABLE TRANSMISSION DATA RATE ADAPTATION," filed Jun. 27, 2008, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support unicast, multicast and/or broadcast transmissions. A unicast transmission is a transmission sent to a specific terminal. A multicast transmission is a transmission sent to a group of terminals. A broadcast transmission is a transmission sent to all terminals. A unicast transmission may be sent at a rate selected to ensure reliable reception by a target terminal. Multicast and broadcast transmissions may be sent at a rate selected to ensure reliable reception by all or most recipient terminals, which may observe different channel conditions.

A conventional broadcast-multicast system, such as a MediaFLO™ system or a Broadcast and Multicast Service (BCMCS) system, is typically intended for large-scale deployment. For a large-scale broadcast-multicast system, an appropriate rate may be pre-selected through link budget studies and field testing and may be a conservative rate in order to ensure reliable reception by a high percentage of terminals in the system. The system may then use the pre-selected rate for all packets sent to the terminals. The pre-selected rate may be very conservative and may result in inefficient use of system resources in many scenarios. It may be desirable to send multicast and broadcast transmissions in an efficient manner in order to improve utilization of system resources.

SUMMARY

Techniques for supporting broadcast/multiple transmission to multiple terminals with feedback and rate adaptation are described herein. A broadcast/multiple transmission is a transmission to multiple terminals and may be a broadcast transmission to all terminals or a multicast transmission to a group of terminals. Rate adaptation refers to the ability to select and/or change a transport format for a transmission based on available information. A transport format may also be referred to as a rate, a transmission format, a packet format, a modulation and coding scheme (MCS), a data rate, a transmission data rate, etc. A transport format may be associated with a modulation scheme, a coding scheme and/or a code rate, a packet size, and/or other transmission parameters.

In an aspect, a combination of hybrid automatic retransmission (HARQ) and at least one shared feedback channel may be used to support highly-scalable rate adaptation for a broadcast/multicast transmission. HARQ allows a base station to send a variable number of transmissions of a packet until the packet is decoded correctly by the recipient terminals. The shared feedback channel(s) may be used by all terminals to send feedback information for the packet and can thus easily scale with any number of terminals. In one design, the feedback information may comprise negative acknowledgment (NAK). A terminal may send NAK on the shared feedback channel(s) if the terminal decoded the packet in error.

In one design, a base station may send at least one transmission of a packet to multiple terminals, one transmission of the packet at a time. The base station may receive feedback information (e.g., NAK) for the packet from the multiple terminals on at least one feedback channel shared by these terminals. In one design, the base station may determine whether to terminate the packet early based on the feedback information for the packet. For example, the base station may terminate the packet if NAK is not received from any terminal after a transmission of the packet. In another design, the base station may use the feedback information for the packet to select a transport format and/or other transmission parameters for another packet.

In another aspect, a transport format and/or other transmission parameters for a broadcast/multicast transmission may be selected based on channel quality indicator (CQI) information from all or a subset of the terminals receiving the broadcast/multicast transmission. To reduce overhead, the terminals may send CQI information at a slow rate and/or only certain terminals may send CQI information. For example, only terminals observing poor channel conditions may send CQI information since these terminals may be the determining factor in rate selection.

In one design, a base station may receive CQI information from at least one of multiple terminals receiving a broadcast/multicast transmission. The base station may also receive feedback information (e.g., NAK) for prior packets. The base station may select a transport format based on the CQI information and possibly the feedback information for the prior packets. The base station may send at least one packet in accordance with the selected transport format to the multiple terminals for the broadcast/multicast transmission.

Various aspects and features of the disclosure are described in further detail below.

BRIEF DESCRIPTION OF THE DRAWINGS

FIGS. 6 and 7 show a process and an apparatus, respectively, for sending a broadcast/multicast transmission with feedback.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques may also be used for broadcast systems. The techniques described herein may be used for the systems and radio technologies mentioned above as well as other systems and radio technologies.

Figure 1:
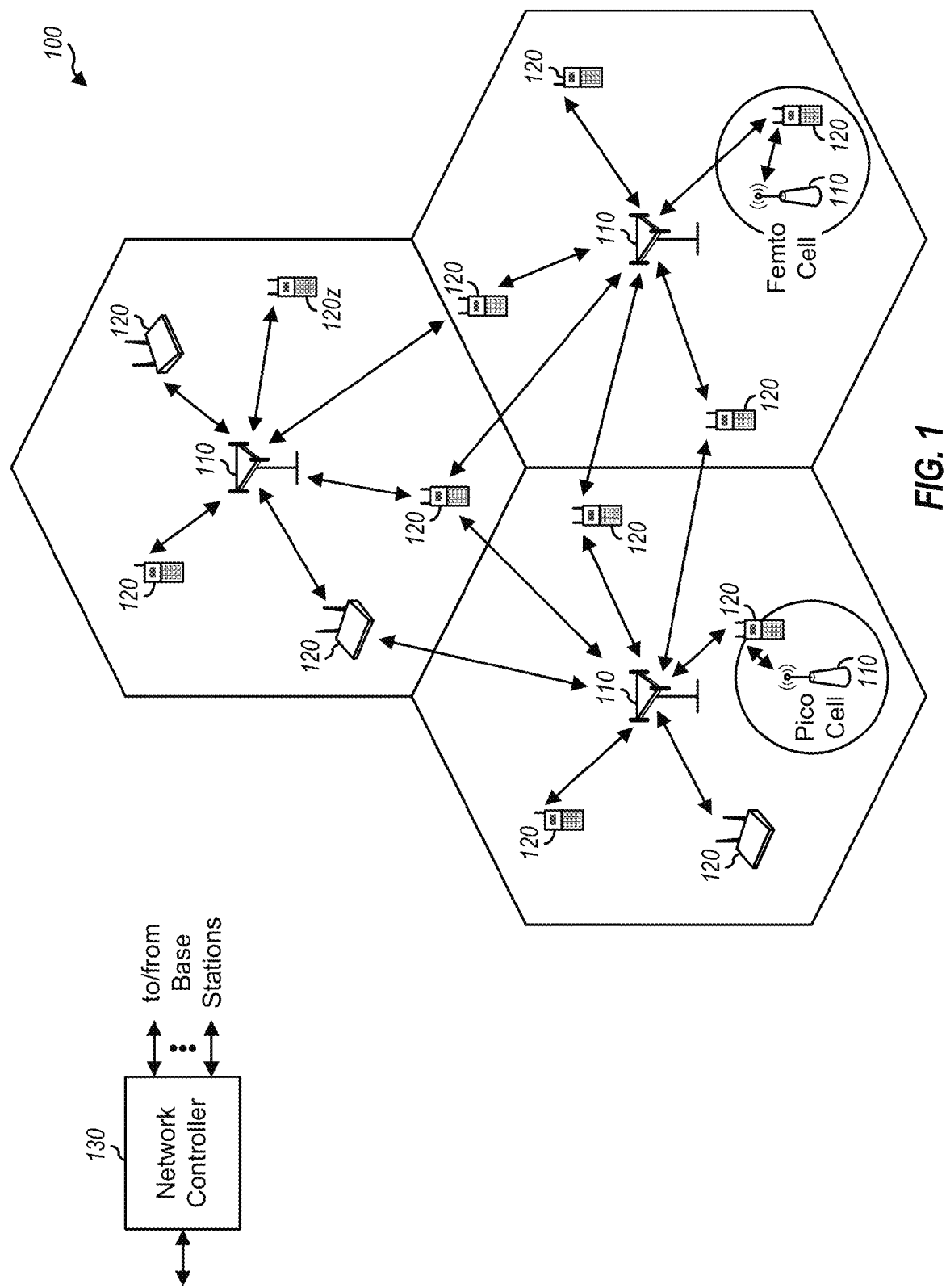
FIG. 1 shows a wireless communication system.

FIG. 1 shows a wireless communication system 100, which may include a number of base stations 110 and other network entities. A base station may be a station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG).

A network controller 130 may couple to a set of base stations and may provide coordination and control for these base stations. Network controller 130 may communicate with base stations 110 via a backhaul. Base stations 110 may also communicate with one another, e.g., directly or indirectly via wireless or wireline backhaul.

Terminals 120 may be dispersed throughout system 100, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

The system may support HARQ in order to improve reliability of data transmission and support rate adaptation. For HARQ on the downlink, a base station may send a transmission of a packet and may send one or more additional transmissions, if needed, until the packet is decoded correctly by a recipient terminal, or the maximum number of transmissions has been sent, or some other termination condition is encountered.

Figure 2:
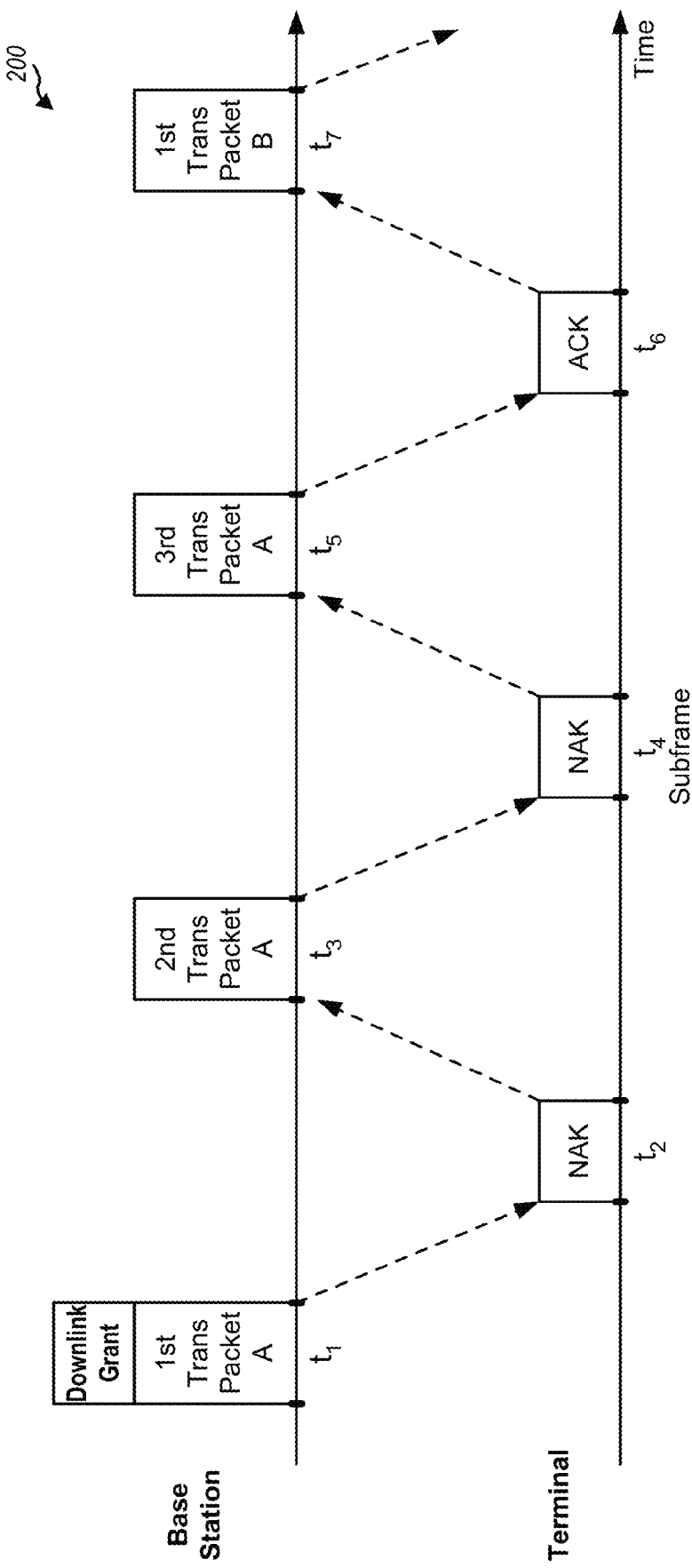
FIG. 2 shows a unicast transmission on the downlink with HARQ.

FIG. 2 shows an exemplary unicast transmission 200 on the downlink with HARQ. The transmission timeline may be partitioned into units of subframes. Each subframe may cover a particular time duration, e.g., 1 milliseconds (ms) in LTE. A subframe may also be referred to as a frame, a slot, a transmission time interval, etc.

In the example shown in FIG. 2, a base station may have data to send to a terminal and may process a data packet (packet A) in accordance with a selected transport format to obtain data symbols. The base station may partition the data symbols into M blocks or subpackets, where M may be any suitable value. For example, M may be equal to 4, 6, 8, etc. Each block may include different redundancy information for packet A.

The base station may send a downlink grant as well as a first transmission of packet A (which may comprise the first block of packet A) to the terminal in subframe $t_1$. The downlink grant may indicate resources used for transmissions of packet A, the selected transport format, etc. The terminal may receive the downlink grant and may decode the first transmission of packet A in accordance with the selected transport format. The terminal may decode packet A in error and may send NAK in subframe $t_2$. The base station may receive the NAK and may send a second transmission of packet A (which may comprise the second block of packet A) in subframe $t_3$. The terminal may receive the second transmission of packet A and may decode the first and second transmissions of packet A, e.g., by soft combining the received symbols for the two transmissions of packet A. The terminal may again decode packet A in error and may send another NAK in subframe $t_4$. The base station may receive the NAK and may send a third transmission of packet A (which may comprise the third block of packet A) in subframe $t_5$. The terminal may receive the third transmission and may decode the first, second and third transmissions of packet A. The terminal may decode packet A correctly and may send an acknowledgement (ACK) in subframe $t_6$. The base station may receive the ACK and may process and send another data packet (packet B) in similar manner.

The base station may process and send a packet such that the packet can be decoded correctly by the terminal with high probability after a target number of transmissions. Each transmission of the packet may be referred to as a packet transmission or an HARQ transmission and may include different redundancy information (e.g., a different set of data symbols) for the packet. The target number of transmissions may be referred to as a target termination for the packet. A transport format may be selected for the packet based on received signal quality at the terminal such that the target termination can be obtained for the packet.

As shown in FIG. 2, the transmissions of a given packet may be separated in time (e.g., by a fixed number of subframes) to allow the terminal to decode the packet and provide ACK/NAK feedback. For synchronous HARQ, Q HARQ interlaces may be defined, where Q may be equal to 4, 6, 8, etc. Each HARQ interlace may include subframes spaced apart by Q subframes. A packet may be sent on one HARQ interlace, and all transmissions of the packet may be sent in subframes spaced apart by Q subframes. The ACK/NAK feedback may be sent on uplink subframes that may be offset by a fixed number of subframes from the downlink subframes used to send the packet.

System 100 may support unicast, multicast and/or broadcast transmissions to terminals. For example, system 100 may support small-scale and/or ad-hoc broadcast-multicast transmissions, which may also be referred to as venue-cast transmissions. A broadcast/multicast transmission may involve a single or few base stations serving a few or possibly many terminals. The composition of the terminals may change dynamically, e.g., some terminals may go out of coverage, while other terminals may come into coverage. In such a scenario, it may be impractical or wasteful in terms of system capacity to select a fixed (and possibly conservative) rate in advance. It may be highly desirable to achieve one or more of the following:

On the long-term, automatically determine an appropriate rate for all terminals being served, On the short-term, quickly terminate transmissions of packets that have been successfully decoded by all terminals in order to efficiently utilize the downlink resources, and Accomplish the long-term and short-term goals with feedback from terminals using a small amount of uplink resources regardless of the number of terminals.

In an aspect, a combination of HARQ and at least one shared feedback channel may be used to support highly scalable rate adaptation for a broadcast/multicast transmission and achieve the objectives noted above. The shared feedback channel(s) may be used by all terminals to send feedback information for packets and can thus easily scale with any number of terminals. In one design, the feedback information may comprise NAK, which may be sent by a terminal if a packet is decoded in error. The base station may continue to send another transmission of the packet until NAK is not received from any terminal.

Figure 3:
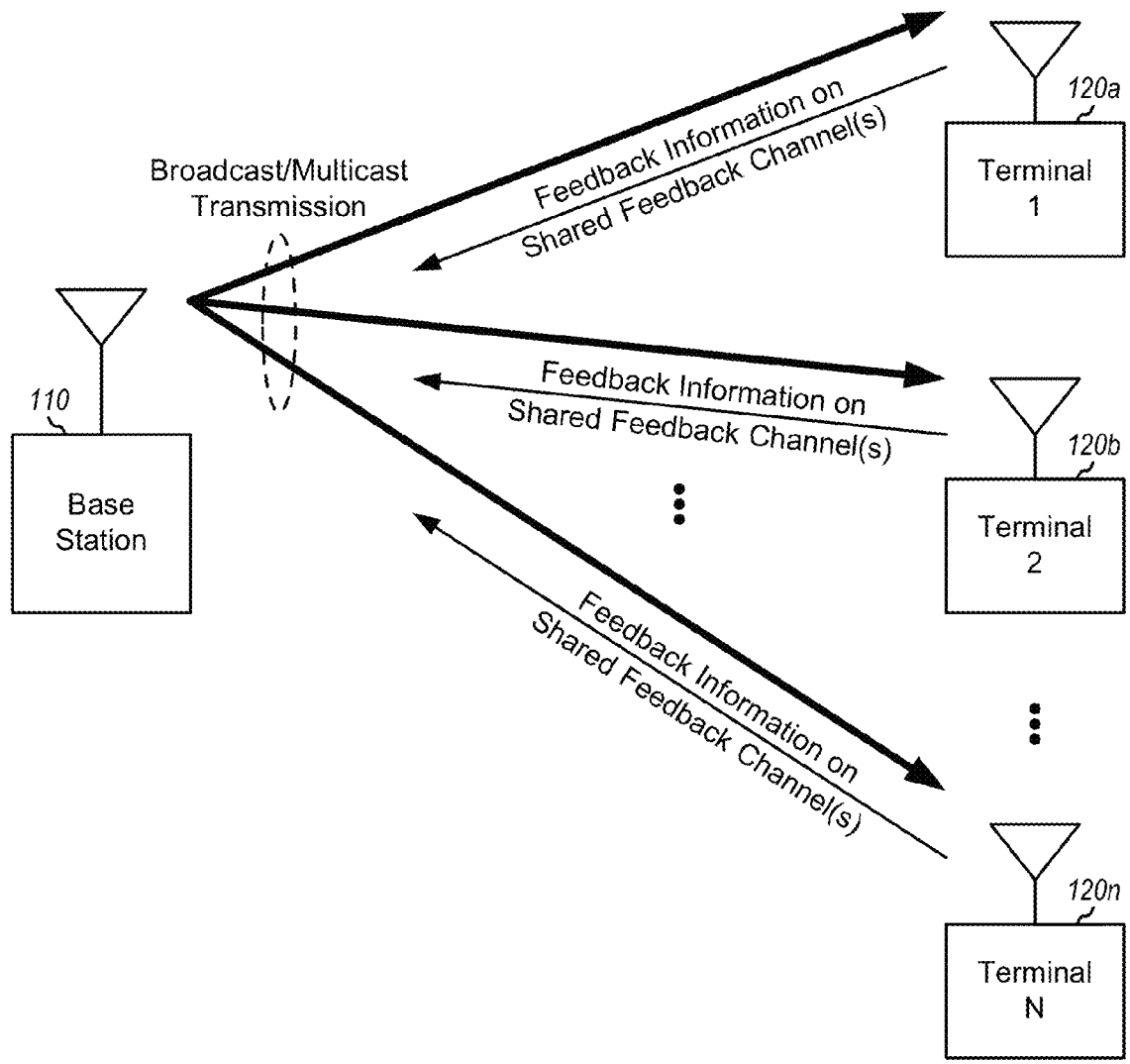
FIG. 3 shows a broadcast/multicast transmission to multiple terminals.

FIG. 3 shows an exemplary broadcast/multicast transmission by a single base station 110 to N terminals 120a through 120n, where N may be any integer value. The N terminals 120 may be located anywhere within the coverage of base station 110 and may achieve different received signal qualities for base station 110. Received signal quality may be quantified by a signal-to-noise-and-interference ratio (SINR) or some other metric. Base station 110 may send transmissions of packets to the N terminals 120. The N terminals 120 may send feedback information for the packets as well as CQI feedback information. Base station 110 may send the broadcast/multicast transmission based on the feedback information such that all terminals 120 can reliably receive the broadcast/multicast transmission, as described below.

Although not shown in FIG. 3, multiple base stations may concurrently send the broadcast/multicast transmission. These multiple base stations may or may not send the broadcast/multicast transmission as a single frequency network (SFN) transmission. For an SFN transmission, all transmitters may transmit the same waveform on the same time-frequency resources. A receiver would then receive the same waveform from all transmitters, except for a transmitter-dependent delay and phase. The receiver can demodulate the SFN transmission from all transmitters, without having to determine which transmitters sent the SFN transmission.

Figure 4:
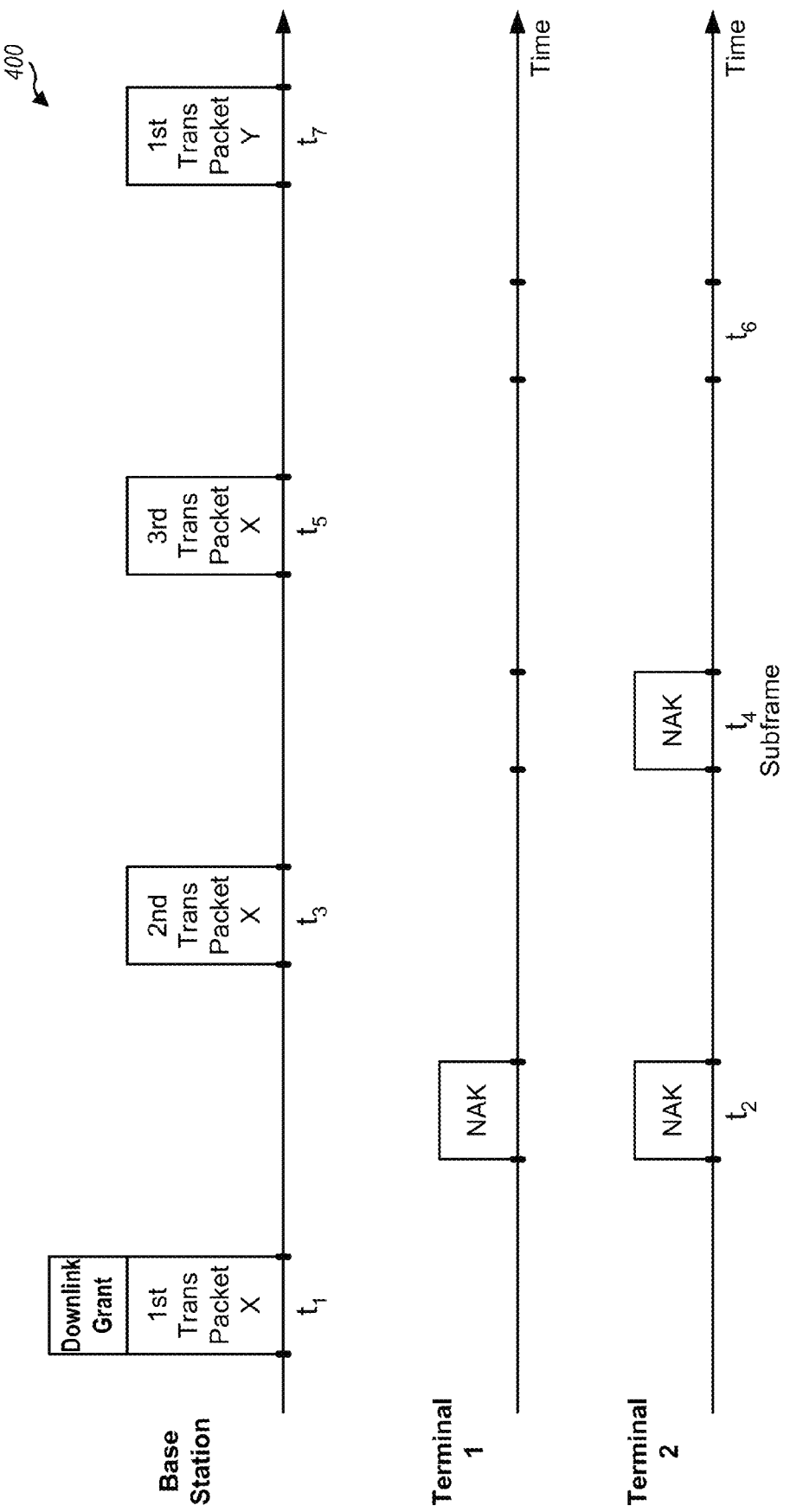
FIG. 4 shows a broadcast/multicast transmission with HARQ.

FIG. 4 shows an exemplary broadcast/multicast transmission 400 with HARQ. For simplicity, FIG. 4 shows one base station sending the broadcast/multicast transmission to two terminals 1 and 2. The base station may process a data packet (packet X) for the broadcast/multicast transmission in accordance with a selected transport format to obtain data symbols. The base station may partition the data symbols into M blocks. The base station may send a first transmission of packet X to the terminals. The base station may also send a downlink grant with the first packet transmission (as shown in FIG. 4) or may not send the downlink grant. Each terminal may receive and decode the first transmission of packet X. In the example shown in FIG. 4, both terminals may decode packet X in error, and each terminal may send NAK on the shared feedback channel(s).

The base station may receive NAKs from the terminals and may send a second transmission of packet X. Each terminal may receive the second transmission of packet X and may decode the first and second transmissions of packet X. Terminal 1 may decode packet X correctly and may skip sending NAK on the shared feedback channel(s). Terminal 1 may thus turn off the NAK feedback after correctly decoding packet X. Terminal 2 may again decode packet X in error and may send NAK on the shared feedback channel(s).

The base station may receive the NAK from terminal 2 and may send a third transmission of packet X. Terminal 1 has correctly decoded packet X and may skip the third transmission. Terminal 2 may receive the third transmission of packet X and may decode the first, second and third transmissions of packet X. Terminal 2 may decode packet X correctly and may skip sending NAK on the shared feedback channel(s). The base station may receive no NAK after the third transmission of packet X and may assume that all terminals have correctly decoded packet X. The base station may then terminate the transmission of packet X. The base station may process and send another data packet (packet Y) in a similar manner. Alternatively, the newly freed resources may be used for other purposes such as a unicast transmission.

As shown in FIG. 4, each terminal may decode a packet after receiving a transmission of the packet. Each terminal may soft combine the current transmission of the packet with previously received transmissions of the same packet. Terminals with higher SINR may be able to correctly decode the packet earlier. Some terminals may have low SINR and may not be able to correctly decode the packet even after receiving all M transmissions of the packet. The transport format of the packet may be selected such that the probability of decoding failure after receiving all M transmissions of the packet is below a target value.

As shown in FIG. 4, the base station may send one transmission of a packet at a time and may detect for NAK after each packet transmission. The base station may continue to send another transmission of the packet or may terminate the packet depending on the received feedback. The base station may terminate the packet early if the packet is decoded correctly by all terminals with fewer than M transmissions of the packet. The base station may then allocate the available resources for other transmissions and may thus avoid wasting resources.

Figure 5:
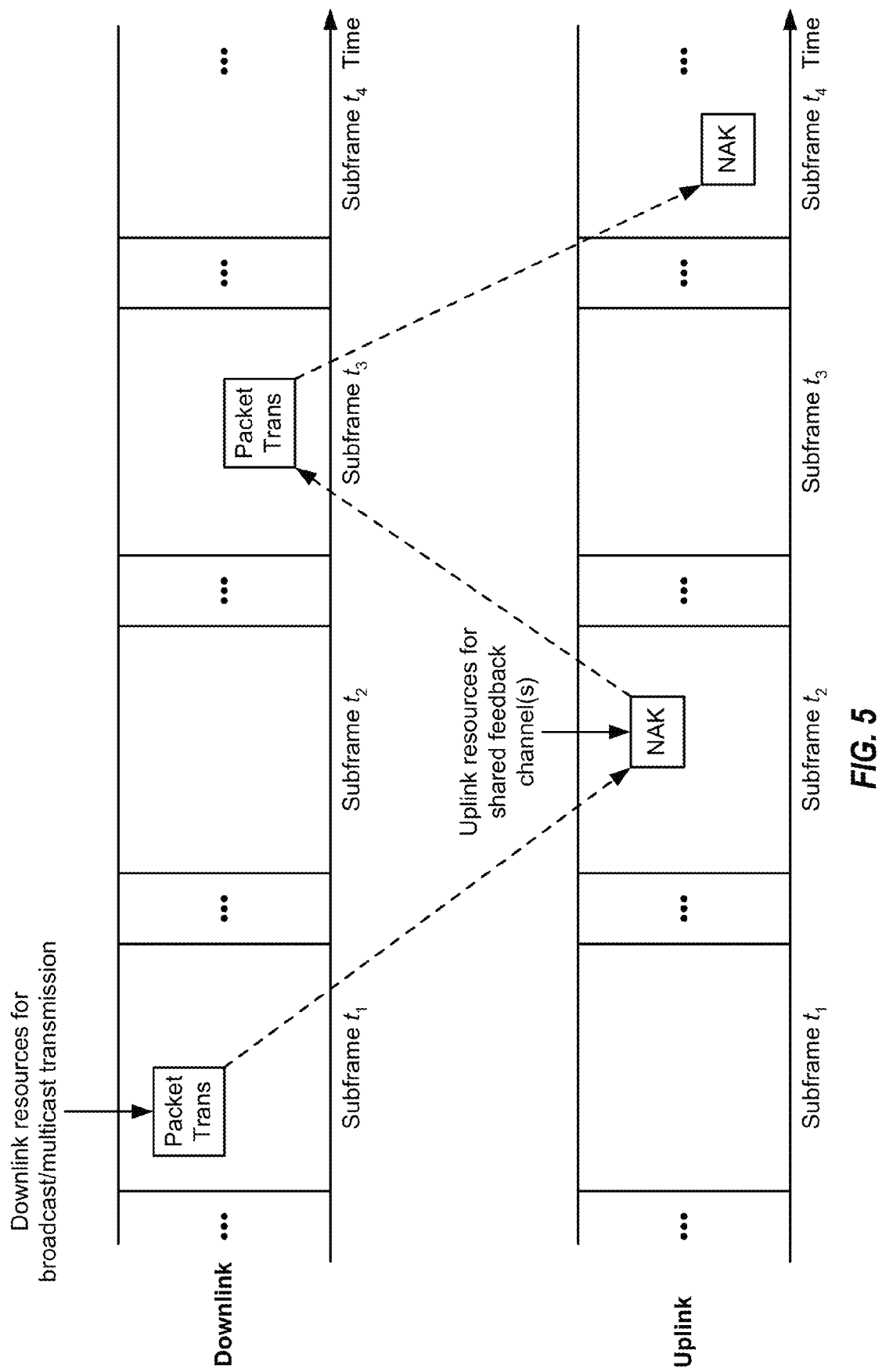
FIG. 5 shows packet transmissions and feedback transmissions.

FIG. 5 shows exemplary packet transmissions on the downlink and NAK transmissions on the uplink. The packet transmissions may be sent on downlink resources allocated for the broadcast/multicast transmission. The NAK transmissions may be sent on uplink resources allocated for the shared feedback channel(s). The downlink resources may occupy the same or different subcarriers in different subframes. The uplink resources may also occupy the same or different subcarriers in different subframes.

In one design, a terminal may send NAK after each transmission of a packet if the terminal decoded the packet in error, e.g., as shown in FIG. 4. In another design, a terminal may skip sending NAK for the first S packet transmissions, where S may be any suitable value. The terminal may send NAK after each subsequent packet transmission if the terminal decoded the packet in error. The likelihood of all terminals correctly decoding the packet after S packet transmissions may be small. This design may reduce the amount of feedback information to send for the packet and may thus reduce the amount of interference due to the feedback information.

In one feedback channel design, a single common feedback channel may be used by all terminals for sending feedback information, e.g., NAK. Certain resources (e.g., time-frequency resources) may be allocated for the common feedback channel. The allocated resources may comprise a set of subcarriers in one or more symbol periods, a subframe, or some other time duration. The allocated resources may also comprise other types of resources, e.g., spreading codes. The allocated resources may be common for all terminals. Hence, the resource allocation for the common feedback channel does not grow with the number of terminals using the common feedback channel. This may allow for a highly scalable design and may also reduce overhead in comparison to a design that allocates feedback resources to each individual terminal.

In one design, the allocated resources for the common feedback channel may be conveyed via a broadcast channel or some other overhead channel. In another design, the allocated resources for the common feedback channel may be linked to the resources used to send packet transmissions. In yet another design, the allocated resources for the common feedback channel may be conveyed by a downlink grant sent with the first transmission of the packet. The allocated resources for the common feedback channel may also be conveyed to the terminals in other manners.

The terminals may transmit NAK on the common feedback channel after each packet transmission. In one design, a terminal may map a sequence of modulation symbols to a set of subcarriers allocated to the common feedback channel and may generate a NAK transmission based on the mapped modulation symbols. In one design, all terminals may use the same sequence of modulation symbols to send NAK, and these terminals may send the same NAK waveform. This design may allow the terminals to send NAK in an SFN manner. In another design, different terminals may use different sequences of modulation symbols, and the NAK transmissions from different terminals may comprise different NAK waveforms. In yet another design, different terminals may use the same sequence of modulation symbols but may apply optional delay and/or phase diversity. For all designs, the NAK transmissions from all terminals may occupy only the resources allocated for the common feedback channel.

The base station may receive NAK transmissions from any number of terminals after a packet transmission and may observe a sum of the NAK transmissions. The base station may detect for NAK based on a combined NAK transmission from all terminals and would not need to decode individual NAK transmissions. The set of terminals sending NAK transmissions may differ for each packet and also for each packet transmission. The base station may detect for NAK by (i) measuring the received energy on resources allocated for the NAK transmissions, (ii) comparing the received energy against an energy threshold, and (iii) declaring a detected NAK if the received energy exceeds the energy threshold. The energy threshold may be a fixed value selected to provide good NAK detection performance. Alternatively, the energy threshold may be a configurable value and may be set to a particular percentage of the total received energy at the base station. If NAK is detected, then the base station may send another transmission of the packet, unless the maximum number of transmissions has already been sent for the packet.

In one design that is described above, a single set of resources may be allocated for the common feedback channel for each packet transmission. Each terminal may send a NAK transmission on the single set of allocated resources. In another design, multiple sets of resources may be allocated for the common feedback channel for each packet transmission. These multiple sets of resources may occupy different subcarriers to provide frequency diversity and combat frequency-selective fading. The use of multiple sets of resources may also combat destructive combining of the NAK transmissions from different terminals on the same resources. In one design, each terminal may send one or more NAK transmissions on one or more sets of resources. Each terminal may use a randomly or deterministically selected sequence of modulation symbols on each set of resources. This design may increase diversity and reduce the probability of destructive combining.

In another design, each terminal may send one NAK transmission on one set of resources using a random phase and may send another NAK transmission on another set of resources using an opposite phase. The two sets of resources may be adjacent to one another. This may allow the base station to perform differential detection for NAK. Thus, if the detected signals on two paired sets of resources are almost negative of each other, then this may be used as an indication of NAK.

In another feedback channel design, multiple feedback channels may be used by the terminals to send feedback information for packets. The multiple feedback channels may also be considered as multiple subchannels of a common feedback channel. The multiple feedback channels may be allocated different resources, e.g., different time-frequency resources, different code resources, etc. Each feedback channel may be assigned to one or more terminals. Each terminal may be assigned to one or more feedback channels, e.g., in a deterministic or random manner. In one design, terminals with similar received SINRs or similar received signal strength at the base station may be assigned to the same feedback channel. In other designs, each terminal may be assigned to one or more feedback channels based on its identity, based on a pseudo-randomly selected value, or based on some other information. The feedback channel assignment for each terminal may be static or may change over time. Various features described above for the common feedback channel (e.g., resource allocation, signaling of resource allocation, etc.) may also be applicable for the multiple feedback channels.

Each terminal may transmit its NAK on its assigned feedback channel(s). The base station may detect for NAK on each feedback channel and may send another packet transmission if NAK is detected on any feedback channel. Using multiple feedback channels may increase diversity and hence reliability of the NAK feedback. Furthermore, the base station may use the information from different feedback channels for various statistical purposes, such as determining whether a small number of terminals is not successfully decoding broadcast/multicast packets.

In another aspect, a transport format and/or other transmission parameters for a broadcast/multicast transmission may be selected based on feedback information from terminals receiving the broadcast/multicast transmission. In one design, a CQI channel may be used by the terminals to send sparse CQI feedback to the base station. The CQI feedback may be sparse in that the terminals may send CQI information at a slow rate and/or only a limited number of terminals may send CQI information. This may reduce overhead for the CQI channel.

A subset of terminals may be selected (e.g., in a deterministic or random manner) to send CQI information. In one design, a terminal may send CQI information with a particular probability. In each CQI reporting interval, the terminal may select a pseudo-random value and may send CQI information if the selected value is less than the particular probability. In another design, only terminals with received SINR below an SINR threshold may send CQI information. These terminals may observe poor channel conditions and may be the determining factor in the selection of a suitable transport format for the broadcast/multicast transmission. Terminals may also be selected for sending CQI information in other manners.

The base station may receive CQI information from a number of terminals and may select an appropriate transport format for the broadcast/multicast transmission based on the CQI information. The base station may select an initial transport format based on CQI information from some or all terminals. During the broadcast/multicast transmission, the terminals may continue to send CQI information at a sparse rate to keep overhead low. The CQI reporting rules during the broadcast/multicast transmission may be similar to, or different from, the CQI reporting rules prior to the broadcast/multicast transmission. For example, more terminals may send CQI information for the initial transport format selection, and only terminals with poor channel conditions may send CQI information during the broadcast/multicast transmission. Poor channel conditions may be quantified by low SINRs, high packet error rate, high number of packet transmissions for successful decoding, etc. In any case, the base station may adjust the transport format for the broadcast/multicast transmission based on the CQI feedback.

The base station may also use NAK feedback to adjust one or more transmission parameters of the broadcast/multicast transmission, e.g., on a long-term basis. The base station may collect statistics for the NAK feedback, e.g., the number of packets terminated early after each number of packet transmissions, the received energy of the NAK transmissions after each number of packet transmissions, etc. In one design, the base station may adjust the transport format based on the NAK feedback. In another design, the base station may adjust the maximum number of packet transmission and/or the target termination based on the NAK feedback. For example, the base station may increase the transport format and/or reduce the maximum number of packet transmissions if all terminals can correctly decode packets prior to the target termination.

Various techniques may also be used to improve performance of a broadcast/multicast transmission. In one design, the base station may use an outer code, such as a Reed-Solomon (RS) code, in order to reduce packet error rate and to safeguard against possible NAK misses during packet transmissions. The base station may send one or more parity transmissions for a packet. Each parity transmission may comprise parity information generated by applying the outer code to the packet. Terminals that have not successfully decoded the packet may use the parity transmission(s) to aid packet decoding. Terminals that have successfully decoded the packet may ignore the parity transmission(s) and may also skip sending NAK for the parity transmission(s). The base station may be confident that all terminals have successfully decoded the packet, either with just the packet transmissions or after a particular number of parity transmissions. The base station may then terminate the parity transmissions for the outer code.

In one design, the base station may ask for cooperation from one or more neighbor base stations for a broadcast/multicast transmission. The base station may send signaling messages to the neighbor base station(s) to ask for reduced interference on downlink resources used for the broadcast/multicast transmission, to request SFN transmission of one or more packets, etc. The base station may also ask the neighbor base station(s) to reduce the transmit power of their terminals on uplink resources for the shared feedback channel(s). The cooperation may allow the base station to achieve a desired broadcast/multicast data rate.

The techniques described herein may be implemented in various wireless systems such as an LTE system, a UMB system, a CDMA or WCDMA system, etc. On the downlink, broadcast/multicast packets may be sent in a similar manner as unicast packets, which may simplify operation and avoid changes to the physical layer. On the uplink, the terminals may send feedback information (e.g., NAK, CQI, etc.) on uplink resources allocated to the feedback channel(s). For example, the feedback information may be sent on a Physical Uplink Control Channel (PUCCH) in an LTE system, and a feedback channel assignment may comprise a set of resource blocks in different subframes. The feedback information may be sent on a CDMA segment or an OFDMA segment in a UMB system, and a feedback channel assignment may comprise a set of hop-ports over certain OFDM symbols.

The LTE and UMB systems may include one or more of the following features:

- Flexible bandwidth from 1.25 to 20 MHz through the use of OFDM with FFT sizes of 128 to 2048 and flexible number of guard subcarriers,
- Transport formats covering a large range of spectral efficiencies,
- Flexible HARQ interlace structure (e.g., 6 and 8 HARQ interlaces, with optional extended transmissions) that may be set individually for each resource assignment, synchronous HARQ,
- Advanced antenna techniques such as transmit diversity, beamforming, spatial division multiple access (SDMA), and spatial multiplexing,
- Flexible resource assignments across time and frequency for downlink and uplink transmissions,
- Persistent and non-persistent scheduling, and
- Other features to improve spectral efficiency, battery life, latency, etc.

A scheduler may schedule data transmission on the downlink and uplink and may allocate resources for each scheduled data transmission. Terminals scheduled for data transmission on the downlink may be informed via downlink grants/assignments. The downlink grants may be sent on a Physical Downlink Control Channel (PDCCH) in LTE or via Forward Link Assignment Blocks (FLABs) in UMB.

A downlink grant for a terminal may convey allocated resources, a transport format, an HARQ structure, advanced antenna techniques, and/or other parameters that may be used for data transmission to the terminal. The downlink grant may be persistent or non-persistent. Resources allocated with a persistent grant may last indefinitely until de-allocated by some means, such as an explicit de-allocation. Resources allocated with a non-persistent grant may last for the duration of one packet. The downlink grant may be sent with the first transmission of the packet, e.g., as shown in FIGS. 2 and 4. A base station may send one or more transmissions of the packet to the terminal. The terminal may decode the packet after receiving each packet transmission and may send ACK/NAK feedback on the PUCCH in LTE or an ACK channel (R-ACKCH) in UMB.

A broadcast/multicast transmission may be supported based on existing features (and possibly some new features, if necessary) of LTE and UMB as follows. For downlink resource allocation, existing transport formats may be used. A broadcast identity (ID) may be assigned to the broadcast/multicast transmission and may be a broadcast Cell Radio Network Temporary Identifier (RNTI), a broadcast Medium Access Control (MAC) ID, etc. A persistent downlink grant may be sent for the broadcast/multicast transmission and may be identified by the broadcast ID. Packet transmissions may be sent via a single logical antenna, which may be mapped to one or more physical antennas. Packet transmissions may also be sent with SDMA, supercast, hierarchical modulation, etc.

Multiple broadcast/multicast transmissions may be sent concurrently and may be multiplexed in time and/or frequency. Different broadcast IDs may be used to uniquely identify different broadcast/multicast transmissions. Each broadcast/multicast transmission may be sent on a respective broadcast channel.

For the uplink, resources may be allocated for one or more shared feedback channels for NAK feedback from the terminals for the broadcast/multicast transmission. The allocated resources may be for the PUCCH in LTE, the R-ACKCH in UMB, etc. The same set of resources (e.g., resource blocks in LTE or R-ACK subtiles in UMB) may be used by all terminals to send NAK feedback.

A terminal receiving the broadcast/multicast transmission may attempt to decode a packet after each transmission of the packet. The terminal may transmit NAK on the allocated resources for the PUCCH or R-ACKCH if the terminal decoded the packet in error. The terminal may skip sending NAK on the PUCCH or R-ACKCH if the terminal decoded the packet correctly. The NAK transmissions for a given broadcast/multicast packet may occur on the same resource blocks or R-ACK subtiles and thus do not utilize separate time-frequency resources for each terminal. The terminal may use a common DFT index (e.g., with optional phase diversity applied) to modulate the allocated resources. Alternatively, different terminals may use different sequences of modulation symbols to improve diversity.

The base station may detect for NAK after each packet transmission and may send another packet transmission if NAK is detected. The base station may adjust the transport format based on the CQI feedback and/or the NAK feedback. If a new transport format is selected, then the base station may send a new downlink grant to convey the new transport format and to terminate the prior downlink grant.

The terminals may also send CQI feedback, which may be used by the base station to select an initiate transport format as well as to update the transport format to account for changing channel conditions.

FIG. 6 shows a design of a process 600 for sending a broadcast/multicast transmission with feedback. Process 600 may be performed by a base station (as described below) or by some other entity. The base station may send at least one transmission of a packet to multiple terminals, one transmission of the packet at a time, up to a maximum number of transmissions (block 612). The base station may receive feedback information for the packet from the multiple terminals on at least one feedback channel shared by these terminals (block 614). The feedback information may be sent by the terminals on the resources allocated for sending the feedback information by the multiple terminals. In one design, the base station may determine whether to terminate the packet early based on the feedback information for the packet (block 616). In another design, the base station may use the feedback information for the packet to determine at least one transmission parameter (e.g., a transport format, the maximum number of packet transmissions, etc.) for a subsequent packet (block 618). The base station may also select at least one transmission parameter for the current packet based on feedback information for prior packets.

In one design, the base station may receive the feedback information for the packet on a single common feedback channel used by all terminals to send the feedback information. In another design, the base station may receive the feedback information for the packet on multiple feedback channels used by the terminals to send the feedback information. Each terminal may be assigned one or more feedback channels and may send feedback information for the packet on each assigned feedback channel.

In one design, the feedback information for the packet may comprise NAK. In one design, each terminal may send NAK after each transmission of the packet if the packet is decoded in error by the terminal and may not send NAK if the packet is decoded correctly by the terminal. The base station may detect for NAK after each transmission of the packet and may terminate the packet if NAK is not detected. For NAK detection, the base station may determine the received energy on resources allocated for the shared feedback channel(s), compare the received energy against a threshold, and declare a detected NAK if the received energy exceeds the threshold. The base station may determine the threshold based on a particular percentage of the total received energy at the base station. The base station may also detect for NAK in other manners.

In one design, the base station may receive CQI information from at least a subset of the multiple terminals. The base station may select a transport format for the packet based on the CQI information. The base station may also select the transport format based on the feedback information for prior packets.

In one design, the base station may generate a downlink grant comprising (i) at least one transmission parameter for the packet and (ii) a broadcast ID assigned to the broadcast/multicast transmission. The base station may send the downlink grant with a first transmission of the packet, e.g., as shown in FIG. 4. In another design, the base station may generate a persistent assignment for the broadcast/multiple transmission and may send the persistent assignment to the terminals. The base station may send transmissions of packets for the broadcast/multicast transmission in accordance with the persistent assignment.

In one design, the base station may send a message to request reduction of interference from at least one neighbor base station on downlink resources used to send transmissions of the packet. In one design, the base station may send a message to request reduction of interference from terminals served by at least one neighbor base station on uplink resources for the shared feedback channel(s).

FIG. 7 shows a design of an apparatus 700 for sending a broadcast/multicast transmission with feedback. Apparatus 700 includes a module 712 to send at least one transmission of a packet to multiple terminals, one transmission of the packet at a time, a module 714 to receive feedback information for the packet from the multiple terminals on at least one feedback channel shared by the terminals, a module 716 to determine whether to terminate the packet early based on the feedback information for the packet, and a module 718 to determine at least one transmission parameter for a subsequent packet based on the feedback information for the packet.

Figure 8:
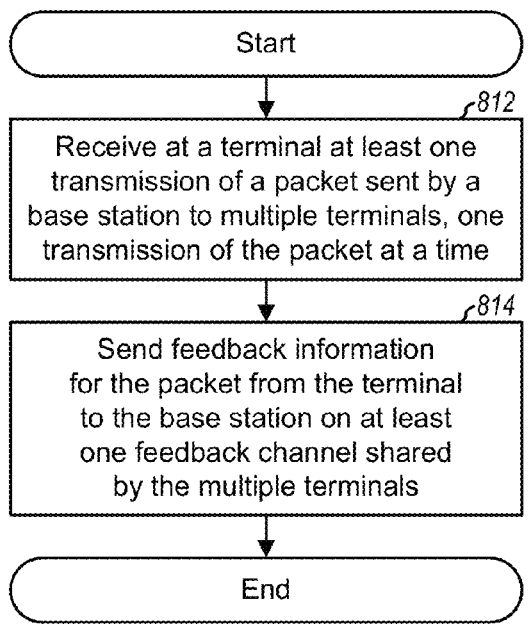
FIGS. 8 and 9 show a process and an apparatus, respectively, for receiving a broadcast/multicast transmission with feedback.

FIG. 8 shows a design of a process 800 for receiving a broadcast/multicast transmission with feedback. Process 800 may be performed by a terminal (as described below) or by some other entity. The terminal may receive at least one transmission of a packet sent by a base station to multiple terminals, one transmission of the packet at a time, up to a maximum number of transmissions (block 812). The terminal may send feedback information for the packet to the base station on at least one feedback channel shared by the multiple terminals (block 814). The base station may determine whether to terminate the packet early and/or may select at least one transmission parameter for a subsequent packet based on the feedback information for the packet from the multiple terminals.

In one design, the terminal may send the feedback information for the packet on a common feedback channel used by all terminals to send the feedback information. In another design, multiple feedback channels may be available. The terminal may determine one or more feedback channels assigned to the terminal among the multiple feedback channels. The terminal may then send the feedback information for the packet on each feedback channel assigned to the terminal.

In one design, the feedback information may comprise NAK. The terminal may send NAK after each transmission of the packet if the packet is decoded in error by the terminal and may skip sending NAK if the packet is decoded correctly. The terminal may send NAK after the first packet transmission or if a particular minimum number of transmissions has been received for the packet. In one design, the terminal may send CQI information to the base station. The CQI information may be used by the base station to select a transport format for the packet.

In one design, the terminal may receive a downlink grant comprising at least one transmission parameter (e.g., a transport format, allocated resources, etc.) for the packet and may process transmissions of the packet in accordance with the downlink grant. In another design, the terminal may receive a persistent assignment for the broadcast/multiple transmission and may process transmissions of packets for the broadcast/multicast transmission in accordance with the persistent assignment.

Figure 9:
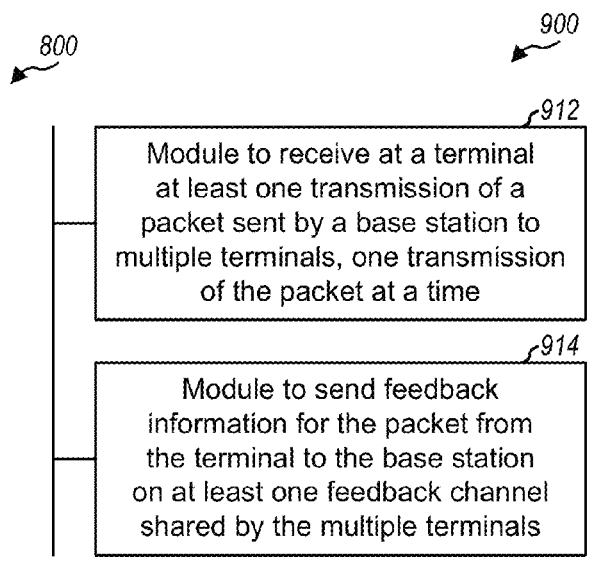

FIG. 9 shows a design of an apparatus 900 for receiving a broadcast/multicast transmission with feedback. Apparatus 900 includes a module 912 to receive at a terminal at least one transmission of a packet sent by a base station to multiple terminals, one transmission of the packet at a time, and a module 914 to send feedback information for the packet from the terminal to the base station on at least one feedback channel shared by the multiple terminals.

Figure 10:
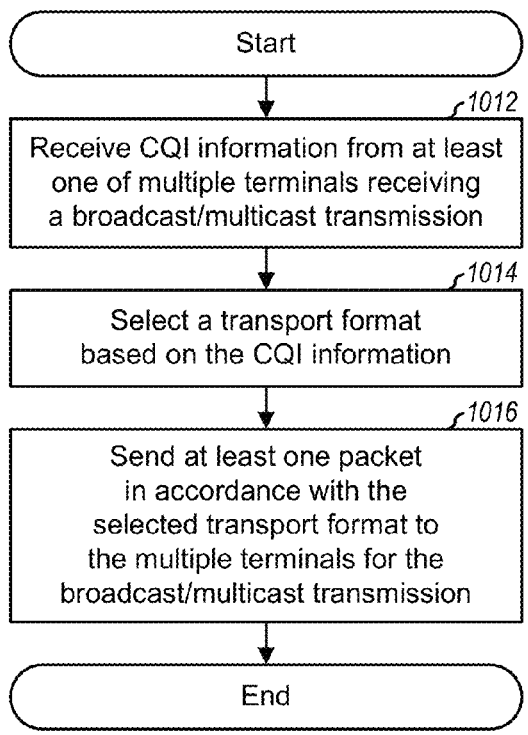
FIGS. 10 and 11 show a process and an apparatus, respectively, for sending a broadcast/multicast transmission with rate adaptation.

FIG. 10 shows a design of a process 1000 for sending a broadcast/multicast transmission with rate adaptation. Process 1000 may be performed by a base station (as described below) or by some other entity. The base station may receive CQI information from at least one of multiple terminals receiving the broadcast/multicast transmission (block 1012). The base station may select a transport format based on the CQI information (block 1014). The base station may send at least one packet in accordance with the selected transport format to the multiple terminals for the broadcast/multicast transmission (block 1016).

The base station may also receive NAK for each packet from the multiple terminals. The base station may determine whether to terminate each packet early based on the NAK received for the packet. The base station may also select or update the transport format based further on NAK received for prior packets.

Figure 11:
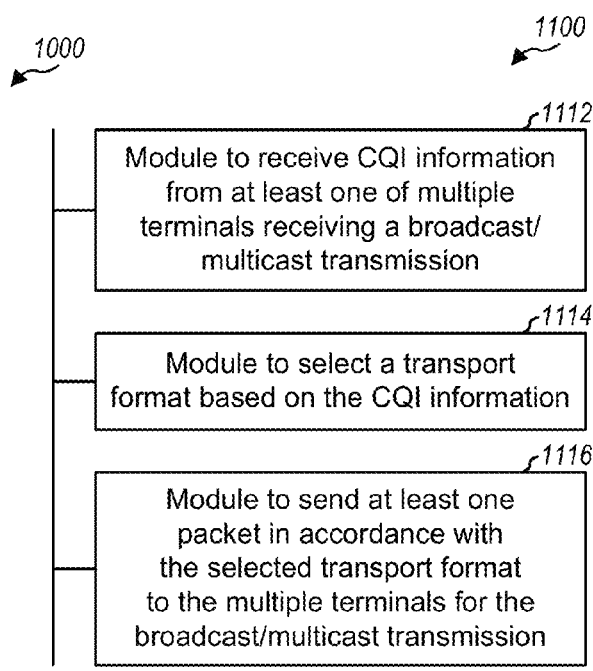

FIG. 11 shows a design of an apparatus 1100 for sending a broadcast/multicast transmission with rate adaptation. Apparatus 1100 includes a module 1112 to receive CQI information from at least one of multiple terminals receiving the broadcast/multicast transmission, a module 1114 to select a transport format based on the CQI information, and a module 1116 to send at least one packet in accordance with the selected transport format to the multiple terminals for the broadcast/multicast transmission.

Figure 12:
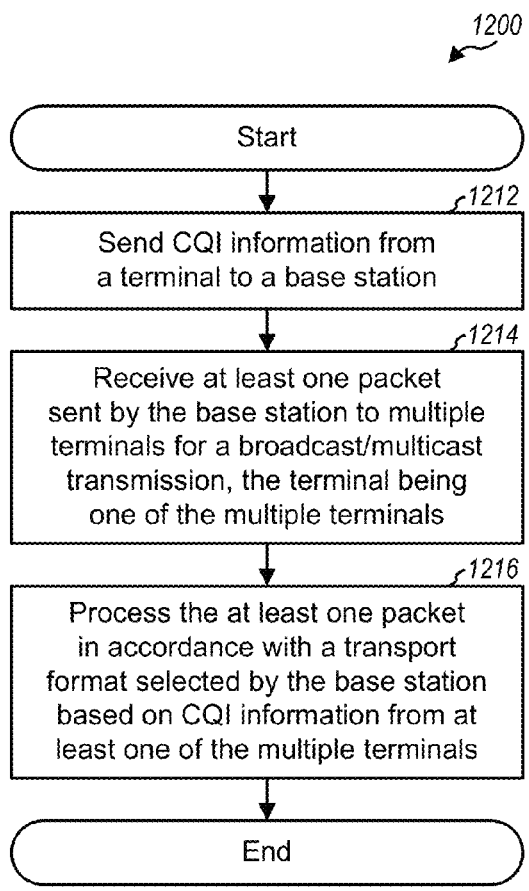
FIGS. 12 and 13 show a process and an apparatus, respectively, for receiving a broadcast/multicast transmission with rate adaptation.

FIG. 12 shows a design of a process 1200 for receiving a broadcast/multicast transmission with rate adaptation. Process 1200 may be performed by a terminal (as described below) or by some other entity. The terminal may send CQI information to a base station (block 1212). The terminal may pseudo-randomly determine whether to send the CQI information to the base station. The terminal may also send the CQI information only if its channel quality is worse than a threshold. The terminal may send the CQI information on at least one shared feedback channel.

The terminal may receive at least one packet sent by the base station to multiple terminals for the broadcast/multicast transmission (block 1214). The terminal may process the at least one packet in accordance with a transport format selected by the base station based on CQI information from at least one of the multiple terminals (block 1216). The terminal may send NAK for each packet to the base station. The base station may determine whether to terminate each packet early and/or may select a transport format for a subsequent packet based on NAK received for the packet from the multiple terminals.

Figure 13:
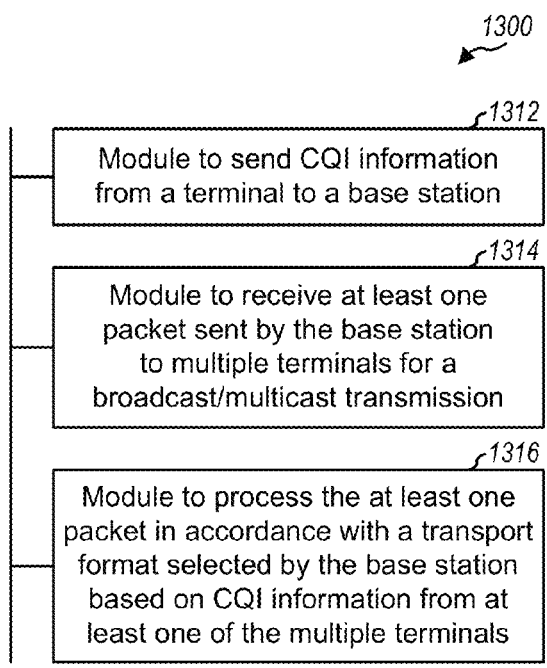

FIG. 13 shows a design of an apparatus 1300 for receiving a broadcast/multicast transmission with rate adaptation. Apparatus 1300 includes a module 1312 to send CQI information from a terminal to a base station, a module 1314 to receive at least one packet sent by the base station to multiple terminals for the broadcast/multicast transmission, the terminal being one of the multiple terminals, and a module 1316 to process the at least one packet in accordance with a transport format selected by the base station based on CQI information from at least one of the multiple terminals.

The modules in FIGS. 7, 9, 11 and 13 may comprise processors, electronics devices, hardware devices, electronics components, logical circuits, memories, software codes, firmware codes, etc., or any combination thereof.

Figure 14:
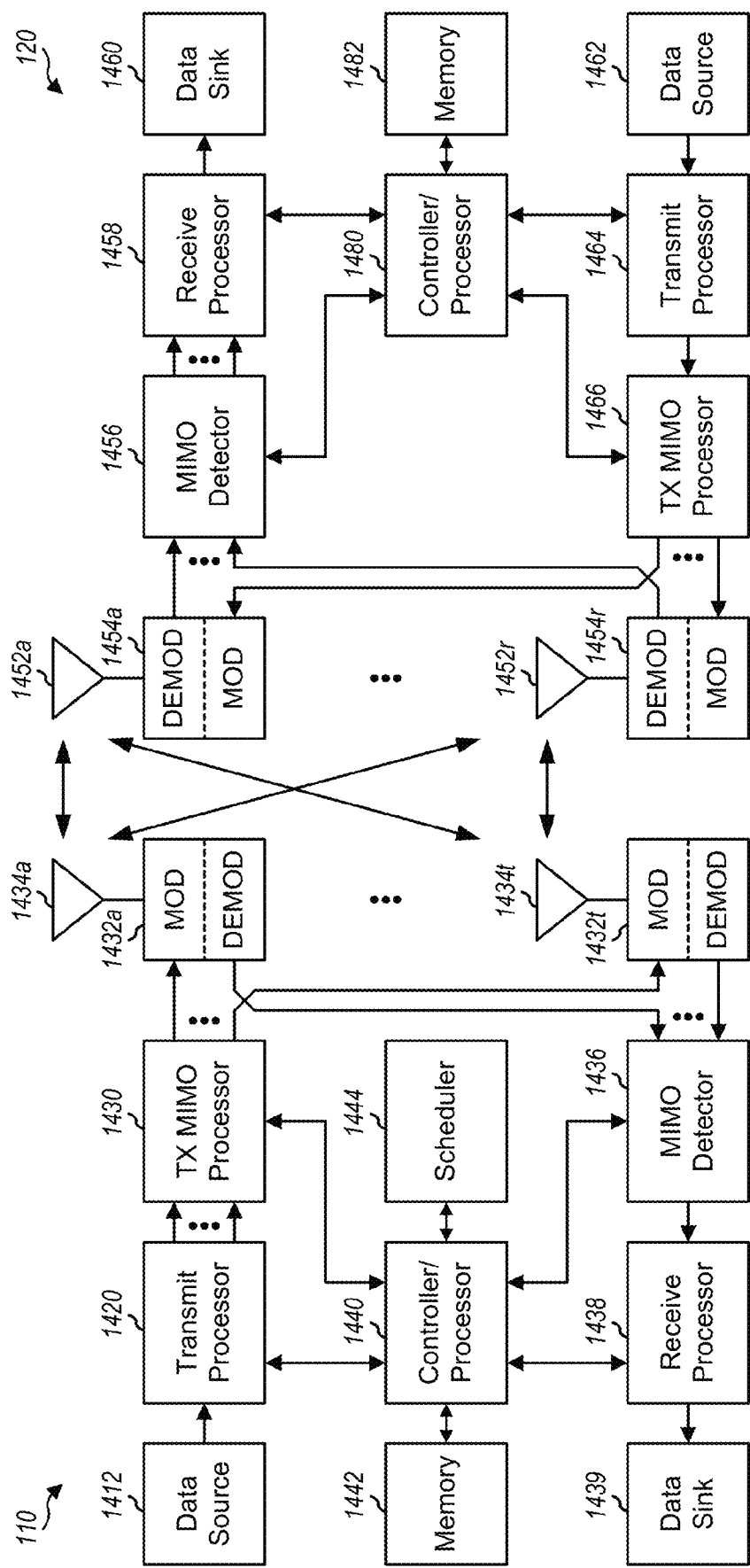
FIG. 14 shows a block diagram of a base station and a terminal.

FIG. 14 shows a block diagram of a design of a base station 110 and a terminal 120, which may be one of the base stations and one of the terminals in FIG. 1. Base station 110 may be equipped with T antennas 1434a through 1434t, and terminal 120 may be equipped with R antennas 1452a through 1452r, where in general $T \geq 1$ and $R \geq 1$.

At base station 110, a transmit processor 1420 may receive data (e.g., for a broadcast/multicast transmission) from a data source 1412 and control information (e.g., for downlink grants, persistent assignments, etc.) from a controller/processor 1440. Processor 1420 may process (e.g., encode and symbol map) the data and control information to obtain data symbols and control symbols, respectively. Processor 1420 may also generate pilot symbols. A transmit (TX) multiple-input multiple-output (MIMO) processor 1430 may perform spatial processing (e.g., preceding) on the data symbols, the control symbols, and/or the pilot symbols, if applicable, and may provide T output symbol streams to T modulators (MODs) 1432*a* through 1432*t*. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink signal. T downlink signals from modulators 1432*a* through 1432*t* may be transmitted via T antennas 1434*a* through 1434*t*, respectively.

At terminal 120, antennas 1452*a* through 1452*r* may receive the downlink signals from base station 110 and may provide received signals to demodulators (DEMODs) 1454*a* through 1454*r*, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all R demodulators 1454*a* through 1454*r*, perform MIMO detection on the received symbols if applicable, and provide detected symbols. A receive processor 1458 may process (e.g., demodulate, deinterleave, and decode) the detected symbols, provide decoded data for terminal 120 to a data sink 1460, and provide decoded control information to a controller/processor 1480.

On the uplink, at terminal 120, a transmit processor 1464 may receive and process data from a data source 1462 and feedback information (e.g., NAK, CQI, etc.) from controller/processor 1480. The symbols from transmit processor 1464 may be precoded by a TX MIMO processor 1466 if applicable, further processed by modulators 1454*a* through 1454*r*, and transmitted to base station 110. At base station 110, the uplink signals from terminal 120 and other terminals may be received by antennas 1434, processed by demodulators 1432, detected by a MIMO detector 1436 if applicable, and further processed by a receive processor 1438 to obtain decoded data and control information sent by terminal 120 and other terminals. Processor 1438 may provide the decoded data to a data sink 1439 and the decoded feedback information to controller/processor 1440.

Controllers/processors 1440 and 1480 may direct the operation at base station 110 and terminal 120, respectively. Processor 1440 and/or other processors and modules at base station 110 may perform or direct process 600 in FIG. 6, process 1000 in FIG. 10, and/or other processes for the techniques described herein. Processor 1480 and/or other processors and modules at terminal 120 may perform or direct process 800 in FIG. 8, process 1200 in FIG. 12, and/or other processes for the techniques described herein. Memories 1442 and 1482 may store data and program codes for base station 110 and terminal 120, respectively. A scheduler 1444 may schedule terminals for data transmission on the downlink and/or uplink. Scheduler 1444 may also schedule broadcast/multicast transmissions and may allocate downlink resources for packet transmissions and uplink resources for feedback transmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   sending at least one transmission of a packet to multiple terminals, one transmission of the packet at a time; and
   receiving feedback information for the packet from the multiple terminals on at least one feedback channel shared by the multiple terminals, wherein the feedback information for the packet comprises negative acknowledgement (NAK); and
   detecting for NAK from any one of the multiple terminals at a base station after each transmission of the packet, wherein the detecting for NAK comprises:
      determining received energy on resources for the at least one feedback channel,
      comparing the received energy against a threshold, and
      declaring a detected NAK if the received energy exceeds the threshold.

2. The method of claim 1, further comprising:
   determining whether to terminate transmission of the packet based on the feedback information for the packet.

3. The method of claim 1, further comprising:
   determining at least one transmission parameter for a subsequent packet based on the feedback information for the packet.

4. The method of claim 1, further comprising:
   selecting at least one transmission parameter for the packet based on feedback information for prior packets.

5. The method of claim 1, wherein the receiving feedback information for the packet comprises receiving the feedback information for the packet on a common feedback channel used by all of the multiple terminals to send the feedback information for the packet.

6. The method of claim 1, wherein the receiving feedback information for the packet comprises receiving the feedback information for the packet on multiple feedback channels used by the multiple terminals to send the feedback information for the packet, wherein each terminal is assigned one or more of the multiple feedback channels and sends feedback information for the packet on each assigned feedback channel.

7. The method of claim 1, wherein each terminal sends NAK after each transmission of the packet if the packet is decoded in error by the terminal and does not send NAK if the packet is decoded correctly by the terminal.

8. The method of claim 1, further comprising:
   terminating further transmission of the packet if NAK is not detected.

9. The method of claim 1, wherein the detecting for NAK further comprises determining the threshold based on a particular percentage of total received energy at the base station.

10. The method of claim 1, further comprising:
    receiving channel quality indicator (CQI) information from at least a subset of the multiple terminals; and
    selecting a transport format for the packet based on the CQI information.

11. The method of claim 1, further comprising:
    generating a downlink grant comprising at least one transmission parameter for the packet and a broadcast identity (ID) assigned to a broadcast/multicast transmission to the multiple terminals; and
    sending the downlink grant with a first transmission of the packet.

12. The method of claim 1, further comprising:
    generating a persistent assignment for a broadcast/multiple transmission to the multiple terminals; and
    sending the persistent assignment to the multiple terminals, and wherein the at least one transmission of the packet is sent in accordance with the persistent assignment.

13. The method of claim 1, further comprising:
    sending a message to request reduction of interference from at least one neighbor base station on downlink resources used to send transmissions of the packet.

14. The method of claim 1, further comprising:
    sending a message to request reduction of interference from terminals served by at least one neighbor base station on resources for the at least one feedback channel.

15. An apparatus for wireless communication, comprising:
    means for sending at least one transmission of a packet to multiple terminals, one transmission of the packet at a time; and
    means for receiving feedback information for the packet from the multiple terminals on at least one feedback channel shared by the multiple terminals, wherein the feedback information for the packet comprises negative acknowledgement (NAK); and
    means for detecting for NAK from any one of the multiple terminals at a base station after each transmission of the packet,
    wherein the means for detecting for NAK is configured to:
       determine received energy on resources for the at least one feedback channel,
       compare the received energy against a threshold, and
       declare a detected NAK if the received energy exceeds the threshold.

16. The apparatus of claim 15, further comprising:
    means for determining whether to terminate transmission of the packet based on the feedback information for the packet.

17. The apparatus of claim 15, further comprising:
    means for determining at least one transmission parameter for a subsequent packet based on the feedback information for the packet.

18. The apparatus of claim 15, wherein each terminal sends NAK after each transmission of the packet if the packet is decoded in error by the terminal and does not send NAK if the packet is decoded correctly by the terminal.

19. The apparatus of claim 15, further comprising:
means for receiving channel quality indicator (CQI) information from at least a subset of the multiple terminals; and
means for selecting a transport format for the packet based on the CQI information.

20. An apparatus for wireless communication, comprising:
at least one processor configured to send at least one transmission of a packet to multiple terminals, one transmission of the packet at a time, and to receive feedback information for the packet from the multiple terminals on at least one feedback channel shared by the multiple terminals, wherein the feedback information for the packet comprises negative acknowledgement (NAK),
the at least one processor further configured to detect for NAK from any one of the multiple terminals at a base station after each transmission of the packet,
wherein the at least one processor detects for NAK by:
determining received energy on resources for the at least one feedback channel,
comparing the received energy against a threshold, and declaring a detected NAK if the received energy exceeds the threshold.

21. The apparatus of claim 20, wherein the at least one processor is configured to determine whether to terminate transmission of the packet based on the feedback information for the packet.

22. The apparatus of claim 20, wherein the at least one processor is configured to determine at least one transmission parameter for a subsequent packet based on the feedback information for the packet.

23. The apparatus of claim 20, wherein each terminal sends NAK after each transmission of the packet if the packet is decoded in error by the terminal and does not send NAK if the packet is decoded correctly by the terminal.

24. The apparatus of claim 20, wherein the at least one processor is configured to receive channel quality indicator (CQI) information from at least a subset of the multiple terminals, and to select a transport format for the packet based on the CQI information.

25. A computer program product, comprising:
a non-transitory computer-readable medium comprising:
code for causing at least one computer to send at least one transmission of a packet to multiple terminals, one transmission of the packet at a time, and
code for causing the at least one computer to receive feedback information for the packet from the multiple terminals on at least one feedback channel shared by the multiple terminals, wherein the feedback information for the packet comprises negative acknowledgement (NAK); and
code for causing the at least one computer to detect for NAK from any one of the multiple terminals at a base station after each transmission of the packet,
wherein the code for causing the at least one computer to detect for NAK further causes the at least one computer to:
determine received energy on resources for the at least one feedback channel,
compare the received energy against a threshold, and declare a detected NAK if the received energy exceeds the threshold.

26. A method for wireless communication, comprising:
receiving at a terminal at least one transmission of a packet sent by a base station to multiple terminals, one transmission of the packet at a time;
sending feedback information for the packet from the terminal to the base station on at least one feedback channel shared by the multiple terminals, wherein the feedback information comprises negative acknowledgement (NAK), the NAK being used to select a transport format for the packet; and
sending channel quality indicator (CQI) information from the terminal to the base station, the CQI information being used to select the transport format for the packet.

27. The method of claim 26, wherein the sending feedback information for the packet comprises sending the feedback information for the packet on a common feedback channel used by all of the multiple terminals to send the feedback information for the packet.

28. The method of claim 26, wherein the at least one feedback channel comprises multiple feedback channels, and wherein the sending feedback information for the packet comprises:
determining one or more feedback channels assigned to the terminal among the multiple feedback channels, and
sending the feedback information for the packet on each feedback channel assigned to the terminal.

29. The method of claim 26, wherein the sending feedback information for the packet comprises:
sending NAK after each transmission of the packet if the packet is decoded in error by the terminal, and
skipping sending NAK if the packet is decoded correctly by the terminal.

30. The method of claim 29, wherein the sending NAK comprises sending NAK after each transmission of the packet if the packet is decoded in error by the terminal and if a particular minimum number of transmissions has been received for the packet.

31. The method of claim 26, further comprising:
receiving a downlink grant comprising at least one transmission parameter for the packet; and
processing the at least one transmission of the packet in accordance with the downlink grant.

32. The method of claim 26, further comprising:
receiving a persistent assignment for a broadcast/multiple transmission to the multiple terminals, and
processing transmissions of packets for the broadcast/multicast transmission, including the at least one transmission of the packet, in accordance with the persistent assignment.

33. An apparatus for wireless communication, comprising:
means for receiving at a terminal at least one transmission of a packet sent by a base station to multiple terminals, one transmission of the packet at a time;
means for sending feedback information for the packet from the terminal to the base station on at least one feedback channel shared by the multiple terminals, wherein the feedback information comprises negative acknowledgement (NAK), the NAK being used to select a transport format for the packet; and
means for sending channel quality indicator (CQI) information from the terminal to the base station, the CQI information being used to select the transport format for the packet.

34. The apparatus of claim 33, wherein the means for sending feedback information for the packet comprises:
means for sending NAK after each transmission of the packet if the packet is decoded in error by the terminal, and
means for skipping sending NAK if the packet is decoded correctly by the terminal.

35. A method for wireless communication, comprising:
receiving channel quality indicator (CQI) information from at least one of multiple terminals receiving a broadcast/multicast transmission;
selecting a transport format for at least one packet based on the CQI information;
sending the at least one packet in accordance with the selected transport format to the multiple terminals for the broadcast/multicast transmission;
receiving negative acknowledgement (NAK) for each packet from the multiple terminals; and
selecting the transport format based further on NAK received for prior packets.

36. The method of claim 35, further comprising:
determining whether to terminate transmission of each packet based on the NAK received for the packet.

37. An apparatus for wireless communication, comprising:
means for receiving channel quality indicator (CQI) information from at least one of multiple terminals receiving a broadcast/multicast transmission;
means for selecting a transport format for at least one packet based on the CQI information;
means for sending the at least one packet in accordance with the selected transport format to the multiple terminals for the broadcast/multicast transmission; and
means for receiving negative acknowledgement (NAK) for each packet from the multiple terminals,
wherein the means for selecting the transport format is configured to select the transport format based further on NAK received for prior packets.

38. The apparatus of claim 37, further comprising:
means for determining whether to terminate transmission of each packet based on the NAK received for the packet.

39. A method for wireless communication, comprising:
sending channel quality indicator (CQI) information from a terminal to a base station;
receiving at least one packet sent by the base station to multiple terminals for a broadcast/multicast transmission, the terminal being one of the multiple terminals;
sending negative acknowledgement (NAK) for each packet from the terminal to the base station; and
processing the at least one packet in accordance with a transport format selected by the base station based on CQI information and NAK from at least one of the multiple terminals.

40. The method of claim 39, wherein the sending CQI information comprises pseudo-randomly determining whether to send the CQI information to the base station.

41. The method of claim 39, wherein the sending CQI information comprises sending the CQI information to the base station only if channel quality of the terminal is worse than a threshold.

42. The method of claim 39, wherein the sending CQI information comprises sending the CQI information on at least one feedback channel shared by the multiple terminals.

43. The method of claim 39, wherein:
the base station determines whether to terminate transmission of each packet based on NAK received for the packet from the multiple terminals.

44. An apparatus for wireless communication, comprising:
means for sending channel quality indicator (CQI) information from a terminal to a base station;
means for receiving at least one packet sent by the base station to multiple terminals for a broadcast/multicast transmission, the terminal being one of the multiple terminals;
means for sending negative acknowledgement (NAK) for each packet from the terminal to the base station; and
means for processing the at least one packet in accordance with a transport format selected by the base station based on CQI information and NAK from at least one of the multiple terminals.

45. The apparatus of claim 44, wherein the means for sending CQI information comprises means for pseudo-randomly determining whether to send the CQI information to the base station.

46. The apparatus of claim 44, wherein the means for sending CQI information comprises means for sending the CQI information to the base station only if channel quality of the terminal is worse than a threshold.

47. The apparatus of claim 44, wherein:
the base station determines whether to terminate transmission of each packet based on NAK received for the packet from the multiple terminals.

48. An apparatus for wireless communication, comprising:
at least one processor configured to:
receive at a terminal at least one transmission of a packet sent by a base station to multiple terminals, one transmission of the packet at a time;
send feedback information for the packet from the terminal to the base station on at least one feedback channel shared by the multiple terminals, wherein the feedback information comprises negative acknowledgement (NAK), the NAK being used to select a transport format for the packet; and
send channel quality indicator (CQI) information from the terminal to the base station, the CQI information being used to select the transport format for the packet.

49. A computer program product, comprising:
a non-transitory computer-readable medium comprising code for causing at least one computer to:
receive at a terminal at least one transmission of a packet sent by a base station to multiple terminals, one transmission of the packet at a time;
send feedback information for the packet from the terminal to the base station on at least one feedback channel shared by the multiple terminals, wherein the feedback information comprises negative acknowledgement (NAK), the NAK being used to select a transport format for the packet; and
send channel quality indicator (CQI) information from the terminal to the base station, the CQI information being used to select the transport format for the packet.

50. An apparatus for wireless communication, comprising:
at least one processor configured to:
receive channel quality indicator (CQI) information from at least one of multiple terminals receiving a broadcast/multicast transmission;
select a transport format for at least one packet based on the CQI information;
send the at least one packet in accordance with the selected transport format to the multiple terminals for the broadcast/multicast transmission;
receive negative acknowledgement (NAK) for each packet from the multiple terminals; and
select the transport format based further on NAK received for prior packets.

51. A computer program product, comprising:
a non-transitory computer-readable medium comprising code for causing at least one computer to:
receive channel quality indicator (CQI) information from at least one of multiple terminals receiving a broadcast/multicast transmission;

select a transport format for at least one packet based on the CQI information;

send the at least one packet in accordance with the selected transport format to the multiple terminals for the broadcast/multicast transmission;

receive negative acknowledgement (NAK) for each packet from the multiple terminals; and select the transport format based further on NAK received for prior packets.

52. An apparatus for wireless communication, comprising:

at least one processor configured to:

send channel quality indicator (CQI) information from a terminal to a base station;

receive at least one packet sent by the base station to multiple terminals for a broadcast/multicast transmission, the terminal being one of the multiple terminals;

send negative acknowledgement (NAK) for each packet from the terminal to the base station; and process the at least one packet in accordance with a transport format selected by the base station based on CQI information and NAK from at least one of the multiple terminals.

53. A computer program product, comprising:

a non-transitory computer-readable medium comprising code for causing at least one computer to:

send channel quality indicator (CQI) information from a terminal to a base station;

receive at least one packet sent by the base station to multiple terminals for a broadcast/multicast transmission, the terminal being one of the multiple terminals;

send negative acknowledgement (NAK) for each packet from the terminal to the base station; and process the at least one packet in accordance with a transport format selected by the base station based on CQI information and NAK from at least one of the multiple terminals.

* * * * *